(12) United States Patent
Dahl et al.

(10) Patent No.: US 12,523,300 B2
(45) Date of Patent: Jan. 13, 2026

(54) STATIC SEAL WITH INTEGRATED SUPPORT FUNCTION

(71) Applicant: Aerostack GmbH, Dettingen an der Erms (DE)

(72) Inventors: Karsten Dahl, Dettingen an der Erms (DE); Alexander Stiefel, Dettingen an der Erms (DE)

(73) Assignee: Aerostack GmbH, Dettingen an der erms (DE)

( * ) Notice: Subject to any disclaimer, the term of this patent is extended or adjusted under 35 U.S.C. 154(b) by 0 days.

(21) Appl. No.: 18/348,530

(22) Filed: Jul. 7, 2023

(65) Prior Publication Data
US 2024/0011561 A1    Jan. 11, 2024

(30) Foreign Application Priority Data

Jul. 8, 2022    (DE) .......................... 102022117065.9

(51) Int. Cl.
| | |
|---|---|
| *F16J 15/12* | (2006.01) |
| *F16J 15/02* | (2006.01) |
| *F16J 15/10* | (2006.01) |

(52) U.S. Cl.
CPC ........... *F16J 15/125* (2013.01); *F16J 15/025* (2013.01); *F16J 15/102* (2013.01); *F16J 15/104* (2013.01)

(58) Field of Classification Search
CPC ........ F16J 15/022; F16J 15/025; F16J 15/061; F16J 15/10; F16J 15/104; F16J 15/12;
(Continued)

(56) References Cited

U.S. PATENT DOCUMENTS

| | | | | |
|---|---|---|---|---|
| 3,848,880 A | * | 11/1974 | Tanner | F16J 15/32 277/467 |
| 4,053,166 A | * | 10/1977 | Domkowski | F16J 15/166 277/558 |

(Continued)

FOREIGN PATENT DOCUMENTS

| | | |
|---|---|---|
| CN | 102410368 A | 4/2012 |
| DE | 102016113865 A1 | 2/2017 |

(Continued)

OTHER PUBLICATIONS

European Office Action for EP Application 23179925.5, dated Feb. 27, 2025, 8 pages.

*Primary Examiner* — Nicholas L Foster
(74) *Attorney, Agent, or Firm* — KDW Firm PLLC

(57) ABSTRACT

A seal with integrated support function for a static axial seal application in the secondary force flux, for a resulting sealing gap, and with variable height. The seal includes a first structure with a first material, and a second structure with a second material. The first and second structures are connected. The first structure has a higher hardness, or Shore A hardness, than the second structure. The first structure has an elongate form, a first and second end, and is insertable lengthwise into a sealing groove. The second structure at least partially encloses the second end and forms a flexible region adjoining the second end, where the seal is compressible in the flexible region and can compensate for differences in height. The seal provides functional integration with integrated support function with a flexible region for bridging large and variable sealing gaps and a sealing function relating to contacting parts.

19 Claims, 2 Drawing Sheets

(58) Field of Classification Search
CPC ........ F16J 15/121; F16J 15/125; F16J 15/127;
F16J 15/102
See application file for complete search history.

(56) References Cited

U.S. PATENT DOCUMENTS

| | | | | |
|---|---|---|---|---|
| 7,762,559 | B2* | 7/2010 | Suzuki | F16J 15/104 |
| | | | | 277/654 |
| 7,784,637 | B2* | 8/2010 | Osborne | F16J 15/3236 |
| | | | | 220/86.1 |
| 7,866,669 | B2* | 1/2011 | Kobayashi | F16J 15/062 |
| | | | | 277/584 |
| 7,896,354 | B2* | 3/2011 | Muramatsu | F16J 15/104 |
| | | | | 277/584 |
| 9,909,667 | B2* | 3/2018 | Fonville | F16J 15/121 |
| 10,197,162 | B2* | 2/2019 | Yanagi | F16J 15/104 |
| 11,231,108 | B2* | 1/2022 | Kim | F16J 15/166 |
| 11,333,248 | B2* | 5/2022 | Yanagi | F16J 15/125 |
| 11,639,754 | B2* | 5/2023 | Yanagi | F16J 15/121 |
| | | | | 277/637 |
| 11,988,285 | B2* | 5/2024 | Hagiwara | F16J 15/064 |
| 2004/0239047 | A1* | 12/2004 | Kent | F16J 15/3236 |
| | | | | 277/628 |
| 2005/0224119 | A1* | 10/2005 | Okamoto | F16J 15/125 |
| | | | | 137/625.69 |
| 2008/0018058 | A1* | 1/2008 | Kobayashi | F16J 15/166 |
| | | | | 277/650 |
| 2009/0174152 | A1* | 7/2009 | Muramatsu | F16J 15/062 |
| | | | | 277/562 |
| 2011/0076848 | A1* | 3/2011 | Datta | B01J 3/03 |
| | | | | 703/2 |
| 2011/0227295 | A1 | 9/2011 | Watanabe | |
| 2012/0175848 | A1* | 7/2012 | Leonard | F16J 15/104 |
| | | | | 277/624 |
| 2013/0001887 | A1* | 1/2013 | Begg | F16J 15/3204 |
| | | | | 277/549 |
| 2014/0070494 | A1* | 3/2014 | Winkelmann | F16J 15/166 |
| | | | | 277/619 |
| 2014/0138385 | A1* | 5/2014 | Wolf | F16J 15/025 |
| | | | | 220/378 |
| 2017/0030466 | A1* | 2/2017 | Fonville | F16J 15/104 |
| 2017/0089465 | A1* | 3/2017 | Yanagi | F16J 15/125 |
| 2019/0353250 | A1 | 11/2019 | Kim | |
| 2020/0191273 | A1* | 6/2020 | Yanagi | F16J 15/062 |
| 2022/0128147 | A1* | 4/2022 | Yanagi | F16J 15/121 |
| 2023/0034614 | A1* | 2/2023 | Okino | F16J 15/062 |

FOREIGN PATENT DOCUMENTS

| | | |
|---|---|---|
| EP | 1835121 A2 | 9/2007 |
| EP | 1873427 A1 | 1/2008 |
| FR | 2187076 A5 | 1/1974 |
| JP | H09226363 A | 9/1997 |
| JP | 2004082899 A | 3/2004 |
| WO | 2019052812 A1 | 3/2019 |

\* cited by examiner

STATIC SEAL WITH INTEGRATED SUPPORT FUNCTION

TECHNICAL FIELD

The present description relates to a static seal with an integrated support function.

BACKGROUND

Seals are elements or structures which have the task of preventing or limiting undesired transfers of material from one location to another. Typically, in this case seals are distinguished in terms of dynamic and static use cases. In the case of dynamic seals, the elements to be sealed move in rotation, in translation or in a combination of the two in relation to one another. Static seals, by contrast, are used in the case of elements which touch one another. Examples of detachable static seals are the use of sealing compounds or the use of O-rings, while undetachable static seals are introduced, for example, by a weld.

If, in a static use case, a seal, for example in the form of a profiled seal, is introduced into a sealing groove and subjected to pressure, depending on the quality and the tolerances of the system elements and the operating pressure it is possible for extrusion of the seal, also referred to as gap extrusion, to occur.

In this case, gap extrusion refers to the process in which the seal is pressed completely or partially into the gap between the components to be sealed by a pressure difference, for example the operating pressure or a pressure in the event of a fault. The distance between these two components is referred to as sealing gap.

The extrusion tendency can be influenced by the hardness and the mechanical properties of the seal material, among other things. Materials with high hardness, stiffness and/or strength generally have a higher resistance to gap extrusion. Therefore, the use of separate supporting rings, what are referred to as backing rings, which consist of a harder material than that of the seal makes it possible to prevent the seal from pressing into the sealing gap.

High manufacturing tolerances, an unequal clamped or screwed connection of the parts being sealed together, and variable sealing gaps owing to unevennesses, thermal expansion, pressure spikes during operation or similar circumstances can enlarge the sealing gap globally or locally and thereby increase the tendency of the seal to gap extrusion, and thus adversely affect the seal.

SUMMARY

The object can be considered that of providing a static seal which eliminates the aforementioned problems.

This object is achieved by the subject matter disclosed herein. Further embodiments will become apparent from the following description.

According to a first aspect, what is specified is a seal with an integrated support function for a static axial seal application in the secondary force flux, in particular for a resulting sealing gap, in particular with a variable height. The seal has a first structure, comprising a first material, and a second structure, comprising a second material. The first structure and the second structure are at least partially connected to one another. The first structure has a higher hardness, in particular Shore A hardness, than the second structure. The first structure has an elongate form and comprises a first end and a second end. The first structure is also configured to be insertable lengthwise into a sealing groove. The second structure at least partially encloses the second end and thus forms a flexible region adjoining the second end. The seal is compressible in the flexible region and can therefore compensate for differences in height.

The seal thus links two functions: firstly, the bridging of relatively large sealing gaps in a static axial seal application in the secondary force flux and, secondly, the avoidance of gap extrusion in the case of relatively large, not precisely defined or variable sealing gaps. This is advantageous in particular in the event of relatively high operating pressures.

According to this embodiment, the seal therefore comprises a first structure which, owing to its material properties, functionally corresponds to a backing ring. The first material therefore resists being pressed into the sealing gap and therefore provides greater resistance to gap extrusion. The second material of the second structure, in terms of its material properties, is designed such that it has a lower hardness than the first material does. In this respect, hardness is understood to mean the mechanical resistance of a material to mechanical penetration of another body. The second structure thus forms a flexible region, wherein a flexible region is understood to mean a region which reversibly deforms under the action of a mechanical load. The proportion of the flexible region over the longitudinal extent of the seal may be 50%, preferably 25%, more preferably 10%, even more preferably less than 5%. If the sealing gap varies, differences in height can be compensated for by compression and/or deformation of the flexible region, with the result that the support function of the backing ring is further ensured. In this way, the sealing function is retained and gap extrusion is avoided.

According to a further embodiment, the second structure comprises a first sealing lip. In this respect, a sealing lip is understood to mean a device which is functionally configured to prevent or limit undesired transfers of material from one location to another at a specific point in the form of a protrusion on the seal. Here, the sealing lip is in contact with the component to be sealed and preferably comprises an elastic material in order to ensure a defined contact surface and sufficient compression of the sealing lip. The pressure-exerting surface in this respect serves as a barrier for the undesired transfer of material. The aim of the seal is to avoid leaking via a transfer of material by convection, permeation and diffusion.

According to a further embodiment, the first sealing lip comprises a third material. As a result, the seal contains three different materials. The requirements for the third material are given primarily by its functional sealing properties. The third material thus does not serve either the support function or the function of forming a flexible region for compensating for differences in height.

According to a further embodiment, the first material and/or the second material comprises an elastomer or a thermoplastic.

An elastomer is understood to mean dimensionally stable but elastically deformable plastics, the glass transition point of which is below the operating temperature. Elastomers can elastically deform when subjected to tensile and compressive loading, but afterwards return to their original, undeformed shape. A primary cause of the resilient elasticity is the capacity of the tangled polymer chains to react to tensile loading by stretching, or disentangling, the chains. If a polymer is expanded by a tensile stress, the chains preferably align in the direction of the loading. The elastomer is thus expanded. As soon as the tensile stress is removed or reduced, the chains resume the random rotational movement, in the course of which they readopt the statistically based Gaussian distribution. The chains revert to their preferred tangled conformation, as a result of which the elastomer contracts. The elasticity thus consists in stretching under tensile stress and contracting after the stress decreases.

A thermoplastic material is understood to mean plastics which can thermoplastically deform within a particular temperature range. This process is reversible, that is to say it can be repeated as often as desired by cooling and reheating up to the molten state, provided that what is referred to as thermal decomposition of the material owing to overheating does not occur.

Thermoplastics have a structure of carbon chains which have little or no branching, that is to say are linear, and are connected to one another only by weak physical bonds. These bonding forces are more effective when the chains have a parallel alignment. Such regions are referred to as crystalline, by contrast to amorphous regions, in which the macromolecules are tangled. In principle, thermoplastics can also be mechanically and thermally processed. Mechanical processing is understood to mean, for example, sawing, milling, grinding, turning and planing, and the joining processes of adhesive bonding and welding.

According to a further embodiment, the first material and/or the second material comprises a thermosetting material.

A thermosetting material is understood to mean plastics which, after being hardened by heating or other measures, can no longer be deformed. They include hard, amorphous, insoluble polymers. The macromolecules are tightly crosslinked via covalent bonds, this causing them not to soften when heated, and therefore after hardening they can only be machined. The precursors or prepolymers are generally synthetic resins, which are still meltable or soluble and—often charged with fillers and dyes—can be cast or hot pressed. The prepolymers are tri-functional or multi-functional compounds which, with the aid of curing agents and possibly catalysts or as a result of high temperatures, polymerize and lead to tight crosslinking. Thermosetting plastics cannot be melted owing to their high degree of crosslinking and decompose after exceeding their decomposition temperature, also referred to as pyrolysis. Thermosetting plastics react to high mechanical action by cracking or splitting. In the case of thermosetting plastics, in the foreground are their high thermomechanical strengths and, compared to metals, their low relative densities.

According to a further embodiment, the second material has a Shore A hardness in the range of 50 to 70, and the first material has a Shore A hardness in the range of 80 to 90. Shore hardness is a material index for elastomers and plastics and is defined in the standards DIN EN ISO 868, DIN ISO 7619-1 and ASTM D2240-00. In this case, a distinction is made between Shore A and Shore D, as described below.

Shore A is specified for soft elastomers, after measurement using a needle with a blunt tip. The end face of the truncated cone has a diameter of 0.79 millimeters, the opening angle is 35°, the applied weight is 1 kg and the holding time is 15 s. Shore A hardness can also be measured in other ways.

Shore D is specified for tough elastomers after measurement with a needle which tapers to a 30° angle and has a spherical tip with a diameter of 0.2 millimeters. The applied weight is 5 kg and the holding time is 15 s.

The core piece of the Shore hardness tester or durometer consists of a spring-loaded pin of hardened steel. The penetration depth of this pin into the material to be tested is a measure of the Shore hardness, which is measured on a scale of 0 Shore, 2.5 millimeters of penetration depth, to 100 Shore, 0 millimeters of penetration depth. A high number thus means great hardness. In the case of a Shore hardness tester, an additional device can be used, which presses the sample to be measured onto the measuring table with a force of 12.5 newtons in the case of Shore A and 50 newtons in the case of Shore D. When determining the Shore hardness, the temperature plays a greater role than when determining the hardness of metallic materials. Therefore, here the setpoint temperature of 23° C. is restricted to the temperature range of ±2 K. The material thickness should be at least 6 millimeters. The hardness of the rubber is determined by the crosslinking, with soft rubber being lightly crosslinked and hard rubber being highly crosslinked. However, the filler content is also decisive for the hardness of a rubber article.

According to a further embodiment, the first structure and the second structure comprise a 2-component rubber-rubber composite.

According to a further embodiment, the material comprises a metallic material. A metallic material is understood to mean all materials which, in solid or liquid form, have high electrical conductivity that decreases as the temperature increases, high heat conductivity, ductility and metallic lustre. These properties are based on the fact that the cohesion between the relevant atoms is effected by the metallic bond, the most important feature of which is the electrons moving freely in the lattice.

According to a further embodiment, the seal is designed to perform the sealing function in the secondary force flux. In the secondary force flux, the seal transmits only some of the force, depending on the required predeformation of the seal when it is being mounted.

According to a further embodiment, the cross section of the seal has a V shape, a K shape or an H shape. In this respect, the cross section is not limited to these shapes and can vary over its longitudinal extent.

According to a further embodiment, the seal comprises a closed geometry or an open geometry over its longitudinal extent.

According to a further embodiment, the second structure comprises a second sealing lip, in particular multiple sealing lips. The number of sealing lips is not limited here and the shape, number and orientation of them may differ.

According to a further embodiment, the first end and/or the second end has a rounded or angled form.

According to a further aspect, what is specified is a vehicle having a seal of the type described above. In this respect, a vehicle is understood to mean, for example, an aircraft, a ship, a spacecraft or a road vehicle. Here, an aircraft is to be understood to mean, for example, a passenger aircraft, a helicopter, a drone, an airship or a glider.

According to a further aspect, what is specified is a device having a seal of the type described above. A device is understood to mean, for example, any device used in stationary mechanical engineering.

BRIEF DESCRIPTION OF THE DRAWINGS

Example embodiments are discussed in more detail below with reference to the appended drawings. The illustrations are schematic and not true to scale. The same reference signs denote identical or similar elements. In the figures.

DETAILED DESCRIPTION

Figure 1:
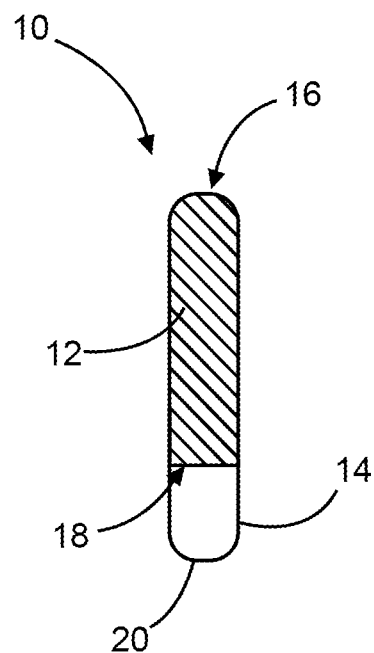
FIG. 1 shows a schematic illustration of a seal with an integrated support function, according to a first example embodiment.

FIG. 1 shows a seal 10 with an integrated support function for a static axial seal application in the secondary force flux, in particular for a resulting sealing gap, in particular with a variable height. The seal has a first structure 12 comprising a first material, and a second structure 14 comprising a second material. The first structure 12 and the second structure 14 are at least partially connected to one another, and the first structure 12 has a higher hardness than the second structure 14. The first structure 12 has an elongate form and comprises a first end 16 and a second end 18. The first structure is also configured to be insertable lengthwise into a sealing groove. The second structure 14 encloses the second end 18 at least partially and thus forms a flexible region 20 adjoining the second end 18, such that the seal is compressible in the flexible region 20 and can therefore compensate for differences in height.

In the embodiment shown, the second end 18 is angled and connected to the second structure 14. In this case, the edge can run perpendicularly or at an angle to the longitudinal extent of the seal 10. The first structure 12 and the second structure 14 may be connected by vulcanization of two elastomer partners, by an integral bond using an adhesion promoter or similar integral bonding joining processes, and/or by a mechanical assembly in the form of a form fit.

Since the second structure 14 forms the flexible region 20, the ratio of the first structure 12 to the second structure 14 along the height of the sealing groove is decisive for compensating for a sealing gap with a variable height. The larger the flexible region 20 is, the higher the difference in height to be compensated of the sealing gap can be. Furthermore, the sealing gap to be compensated in terms of height also depends on the geometry of the actual sealing element, the overall height of the component, the materials used and the shaping of the seal as a whole.

Preferably, the second material is an elastomer and has a Shore A hardness in the range of 50 to 70, and the first material has a Shore A hardness in the range of 80 to 90.

Figure 2:
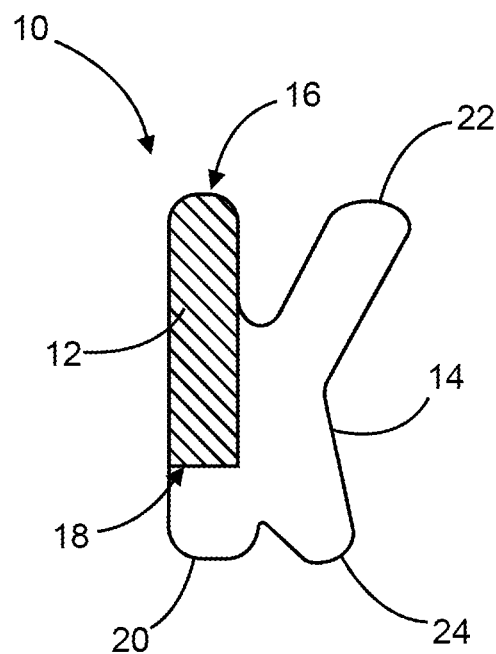
FIG. 2 shows a schematic illustration of a seal with an integrated support function, according to a further example embodiment.

FIG. 2 shows a further embodiment of the seal 10 described in FIG. 1 with an integrated support function for a static axial seal application in the secondary force flux, in particular for a resulting sealing gap, in particular with a variable height. The seal 10 likewise has a first structure 12 comprising a first material, and a second structure 14 comprising a second material. The first structure 12 and the second structure 14 are at least partially connected to one another, and the first structure 12 has a higher hardness, in particular Shore A hardness, than the second structure 14. The first structure 12 has an elongate form and comprises a first end 16 and a second end 18. The first structure 12 is also configured to be insertable lengthwise into a sealing groove. The second structure 14 can enclose the second end 18 at least partially, as in the case shown, and thus forms a flexible region 20 adjoining the second end 18, such that the seal is compressible in the flexible region 20 and can therefore compensate for differences in height.

The seal 10 described in FIG. 2 differs by virtue of two additional sealing lips 22 and 24. The cross section of the seal 10 has a K shape. The sealing lips 22 and 24 can be made of the same material as the second structure 14. As an alternative, the sealing lips 22 and 24 can be made of a material different from the material of the second structure 14. The material of the first sealing lip 22 can differ from or be identical to the material of the second sealing lip 24.

Figure 3:
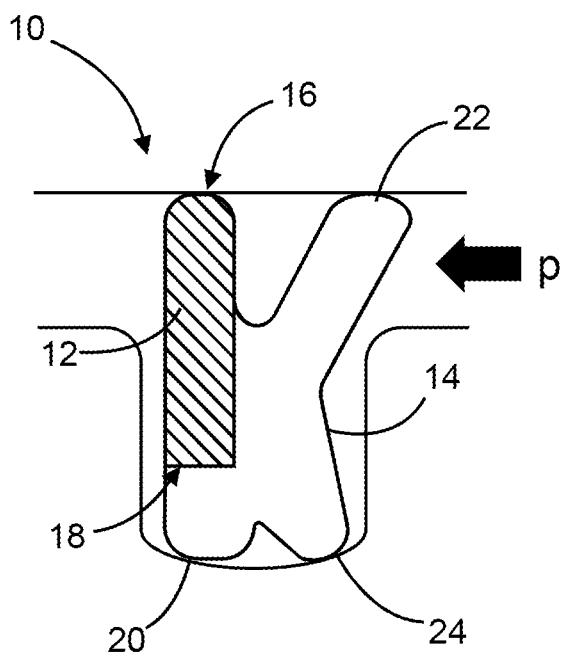
FIG. 3 shows a schematic illustration of the seal with an integrated support function from FIG. 2 in the installed state, according to a further example embodiment.

FIG. 3 shows the embodiment described in FIG. 2 in an installed state. Here, the seal 10 is disposed in a sealing groove. The first end 16 and the first sealing lip 22 are in contact with a first component and the flexible region 20 and the second sealing lip 24 are in contact with the groove bottom. A media pressure p acts on the seal in the direction of the arrow. The two sealing lips 22, 24 seal the two parts which make contact with respect to the media pressure and the resulting convection of the medium. Since the sealing lips 22, 24 work counter to the pressure direction in wedge-shaped and concave fashion, the sealing lips are pressed against the respective components, as a result of which the pressure-exerting surface area and thus the sealing action are increased.

Figure 4:
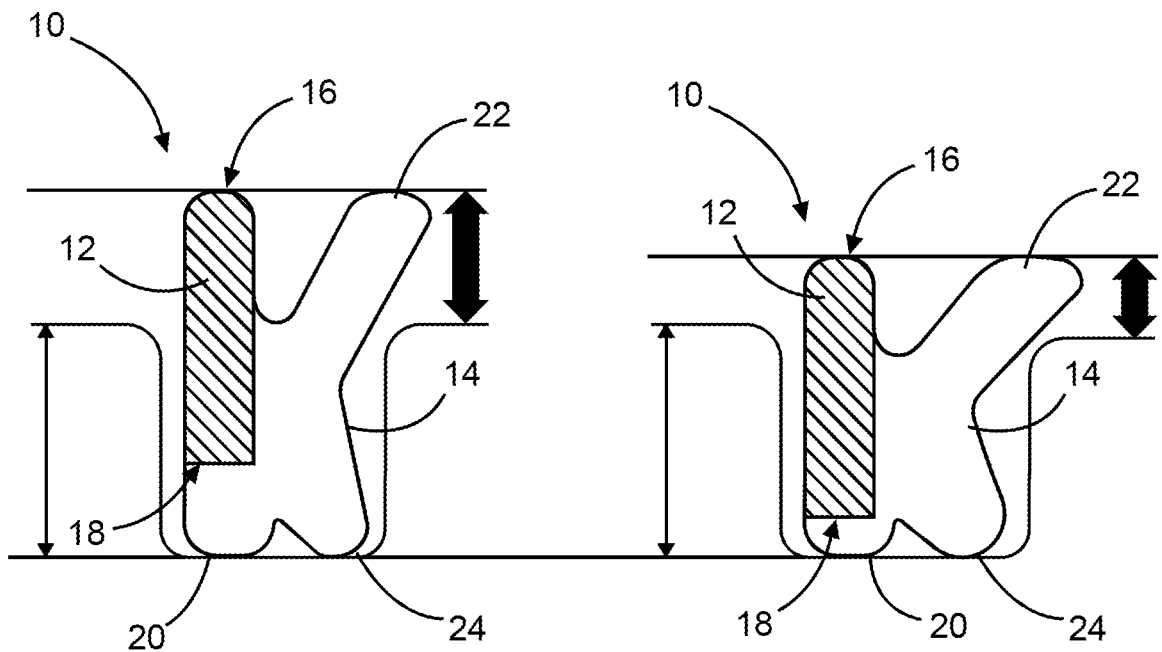
FIG. 4 shows a schematic illustration of a seal with an integrated support function in the installed state with sealing gaps of different sizes, according to a further example embodiment.

FIG. 4 shows two illustrations of the seal 10 described in FIG. 2, wherein the sealing gap is larger in the left-hand illustration than in the right-hand illustration.

The same seal in the same sealing groove is illustrated. It is just that the sealing gap is smaller in the right-hand illustration. This can for example occur in applications if large housing seals with a nonuniform screwed connection are involved, the manufacturing tolerances are very great, or the plane parallelism is not sufficient. It is also conceivable for different applications to be involved.

In the left-hand illustration, the compressible region 20 is only slightly compressed, wherein the sealing lips 22, 24 are in contact with the components and seal them.

In the right-hand illustration, the compressible region 20 is compressed by the smaller sealing gap to a greater extent, with the result that the height extent of the seal 10 is reduced. The first sealing lip 22 and the second sealing lip 24 are likewise compressed, with the result that the sealing function can still be ensured.

Therefore, a difference in height in the sealing gap can be compensated for by the seal 10 via the compressible region 20.

Figure 5:
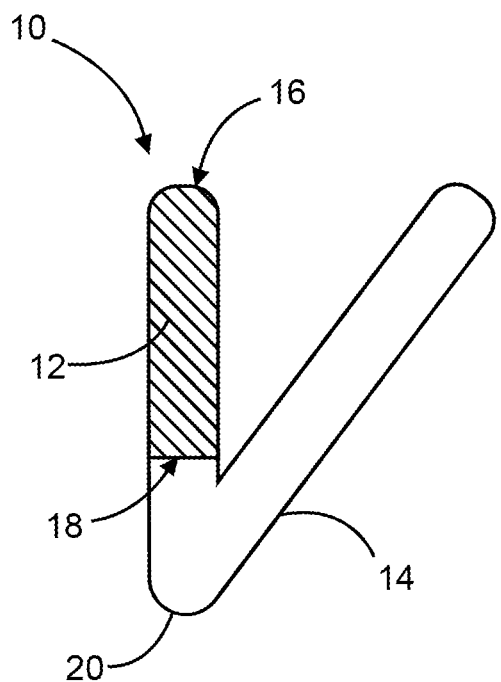
FIG. 5 shows a schematic illustration of a seal with an integrated support function, according to a further example embodiment.

FIG. 5 shows a further embodiment of the seal 10 with an integrated support function for a static axial seal application in the secondary force flux, in particular for a resulting sealing gap, in particular with a variable height. The seal has a first structure 12 comprising a first material, and a second structure 14 comprising a second material. The first structure 12 and the second structure 14 are at least partially connected to one another, and the first structure 12 has a higher hardness than the second structure 14. The first structure 12 has an elongate form and comprises a first end 16 and a second end 18. The first structure is also configured to be insertable lengthwise into a sealing groove. The second structure 14 encloses the second end 18 at least partially and thus forms a flexible region 20 adjoining the second end 18, such that the seal is compressible in the flexible region 20 and can therefore compensate for differences in height.

Here, the seal has only one first sealing lip 22. The transition from the first sealing lip 22 to the flexible region 20 may be sharp-edged or continuous in this case. The wall thickness of the sealing lip 22 can differ from or be identical to the wall thickness of the first structure 12.

Figure 6:
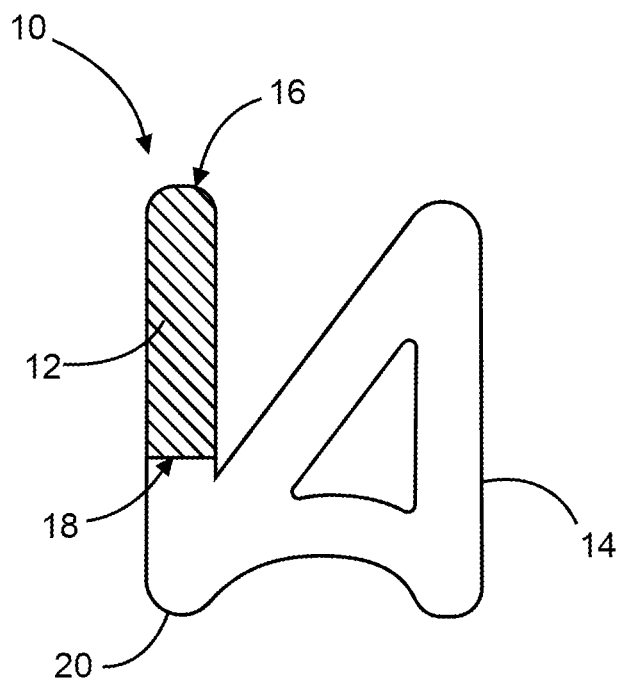
FIG. 6 shows a schematic illustration of a seal with an integrated support function, according to a further example embodiment.

FIG. 6 shows a further embodiment of the seal 10 with an integrated support function for a static axial seal application in the secondary force flux, in particular for a resulting sealing gap, in particular with a variable height. The seal has a first structure 12 comprising a first material, and a second structure 14 comprising a second material. The first structure 12 and the second structure 14 are at least partially connected to one another, and the first structure 12 has a higher hardness than the second structure 14. The first structure 12 has an elongate form and comprises a first end 16 and a second end 18. The first structure is also configured to be insertable lengthwise into a sealing groove. The second structure 14 encloses the second end 18 at least partially and thus forms a flexible region 20 adjoining the second end 18, such that the seal is compressible in the flexible region 20 and can therefore compensate for differences in height.

In this embodiment, the first sealing lip 22 and the second sealing lip 24 are connected via a third sealing lip in such a way that a cavity is formed.

What all these embodiments have in common is that the hardness of the first structure 12, which is higher than that of the second structure 14, prevents gap extrusion, wherein the flexible region 20 of the second structure 14 makes it possible to compensate for differences in height along a sealing gap.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

10 Seal
12 First structure
14 Second structure
16 First end
18 Second end
20 Flexible region
22 First sealing lip
24 Second sealing lip

The invention claimed is:

1. A seal with an integrated support function for a static axial seal application in a secondary force flux, for a resulting sealing gap between a first component and a sealing groove formed in a second component, and with a variable height, comprising:
a first structure comprising a first material, the first structure having an elongate form that extends in a lengthwise direction between a first end and a second end; and
a second structure comprising a second material, the second structure having, at least in part, an elongate form that extends in a lengthwise direction between a first end and a second end;
wherein the first structure and the second structure are at least partially connected to one another;
wherein the first structure has a higher hardness, or a higher Shore A hardness, than the second structure;
wherein the second structure at least partially encloses the second end of the first structure and thus forms a flexible region adjoining the second end of the first structure;
wherein the first structure is configured to be insertable into the sealing groove such that the lengthwise direction is substantially aligned with a height of the sealing groove, wherein the first end of the first structure is configured for contact with the first component and the flexible region of the second structure is configured for contact with the second component within the sealing groove such that the seal is compressible in the flexible region and can therefore compensate for differences in height between the first component and the sealing groove of the second component;
wherein the second structure comprises a first sealing lip that is defined by the first end of the second structure and is configured to extend away from the flexible region, out of the sealing groove; and
wherein the second structure comprises a second sealing lip that is configured to extend away from the flexible region, toward a bottom of the sealing groove;
wherein the first sealing lip is configured for contact with the first component;
wherein the second sealing lip is configured for contact with the second component within the sealing groove;
wherein the first sealing lip comprises a third material, which is different from the second material;
wherein the seal has a cross-sectional shape that is in a shape of an H or a K;
wherein the first structure defines at least a portion of a first strut of the H or the K and the second structure defines at least a portion of a second strut of the H or the K; and
wherein the first material and/or the second material comprises an elastomer or a thermoplastic.

2. The seal according to claim 1, wherein the first material and/or the second material comprises a thermosetting plastic.

3. The seal according to claim 1, wherein the second material has a Shore A hardness in a range of 50 to 70, and the first material has a Shore A hardness in a range of 80 to 90.

4. The seal according to claim 1, wherein the first structure and the second structure comprise a 2-component rubber-rubber composite.

5. The seal according to claim 1, wherein the seal is configured to perform the sealing function in the secondary force flux.

6. The seal according to claim 1, wherein the seal comprises a closed geometry or an open geometry over its longitudinal extent.

7. The seal according to claim 1, wherein the first end and/or the second end has a rounded or angled form.

8. A vehicle having a seal according to claim 1, wherein the vehicle is an aircraft, a ship, a spacecraft or a road vehicle.

9. The seal according to claim 1, wherein:
the cross-sectional shape of the seal is in the shape of the H and the first strut is parallel to the second strut, both extending in a vertical direction; and
both the first end of the first structure and the first end of the second structure are in contact with the first component.

10. The seal according to claim 9, wherein:
the cross-sectional shape of the seal is in the shape of the K, the first strut extends in a vertical direction;
the second strut extends inclined at a non-zero angle relative to the first strut; and
both the first end of the first structure and the first end of the second structure are in contact with the first component.

11. The seal according to claim 10, wherein the first end of the first structure protrudes vertically to define an uppermost edge of the seal and is spaced apart from and does not directly contact the second structure.

12. The seal according to claim 11, wherein the seal is a form seal that can be manufactured using injection molding, with a closed contour suitable for high-pressure environments.

13. The seal according to claim 12, wherein the seal is capable of reliably sealing axial gaps of variable height under increased internal pressure conditions while maintaining structural stability.

14. A device comprising:
a first component;
a second component spaced apart from the first component by a sealing gap, the second component comprising a sealing groove formed therein; and
a seal arranged between the first component and the second component, the seal comprising:
a first structure comprising a first material, the first structure having an elongate form that extends in a lengthwise direction between a first end and a second end; and
a second structure comprising a second material, the second structure having, at least in part, an elongate form that extends in a lengthwise direction between a first end and a second end;
wherein the first structure and the second structure are at least partially connected to one another;
wherein the first structure has a higher hardness, or a higher Shore A hardness, than the second structure;
wherein the second structure at least partially encloses the second end of the first structure and thus forms a flexible region adjoining the second end of the first structure;
wherein the first structure is positioned into the sealing groove such that the lengthwise direction is substantially aligned with a height of the sealing groove, wherein the first end of the first structure is in contact with the first component and the flexible region of the second structure is in contact with the second component within the sealing groove such that the seal is compressible in the flexible region and can therefore compensate for differences in height between the first component and the sealing groove of the second component;
wherein the second structure comprises a first sealing lip that that is defined by the first end of the second structure and is extends away from the flexible region, out of the sealing groove; and
wherein the second structure comprises a second sealing lip that extends away from the flexible region, toward a bottom of the sealing groove;
wherein the first sealing lip is in contact with the first component;
wherein the second sealing lip is in contact with the second component within the sealing groove;
wherein the first sealing lip comprises a third material, which is different from the second material;
wherein the seal has a cross-sectional shape that is in a shape of an Hora K;
wherein the first structure defines at least a portion of a first strut of the H or the K and the second structure defines at least a portion of a second strut of the H or the K; and
wherein the first material and/or the second material comprises an elastomer or a thermoplastic.

15. The device according to claim 14, wherein:
the cross-sectional shape of the seal is in the shape of the H and the first strut is parallel to the second strut, both extending in a vertical direction; and
both the first end of the first structure and the first end of the second structure are in contact with the first component.

16. The device according to claim 15, wherein:
the cross-sectional shape of the seal is in the shape of the K, the first strut extends in a vertical direction;
the second strut extends inclined at a non-zero angle relative to the first strut; and
both the first end of the first structure and the first end of the second structure are in contact with the first component.

17. The device according to claim 16, wherein the first end of the first structure protrudes vertically to define an uppermost edge of the seal and is spaced apart from and does not directly contact the second structure.

18. The device according to claim 17, wherein the seal is a form seal that can be manufactured using injection molding, with a closed contour suitable for high-pressure environments.

19. The device according to claim 18, wherein the seal is capable of reliably sealing axial gaps of variable height under increased internal pressure conditions while maintaining structural stability.

* * * * *